United States Patent
Forsythe et al.

(10) Patent No.: US 11,262,128 B2
(45) Date of Patent: Mar. 1, 2022

(54) FLUIDIZED BED SYSTEM

(71) Applicant: Nous, LLC, Florence, AL (US)

(72) Inventors: Phillip Alan Forsythe, Florence, AL (US); Charles Ryan Mowery, Franklin, TN (US); James Trevor Reed, Tuscambia, AL (US); Christopher Eric Jones, Saint Joseph, TN (US)

(73) Assignee: NOUS, LLC, Florence, AL (US)

( * ) Notice: Subject to any disclaimer, the term of this patent is extended or adjusted under 35 U.S.C. 154(b) by 77 days.

(21) Appl. No.: 16/897,231

(22) Filed: Jun. 9, 2020

(65) Prior Publication Data

US 2020/0300545 A1   Sep. 24, 2020

Related U.S. Application Data

(63) Continuation of application No. 15/899,249, filed on Feb. 19, 2018, now Pat. No. 10,690,412.
(Continued)

(51) Int. Cl.
*F26B 3/08* (2006.01)
*F26B 25/00* (2006.01)
(Continued)

(52) U.S. Cl.
CPC ........ *F26B 25/007* (2013.01); *B01D 46/0041* (2013.01); *B01J 2/16* (2013.01);
(Continued)

(58) Field of Classification Search
CPC .......... F26B 25/007; F26B 23/02; F26B 3/08; F26B 3/084; F26B 3/082; B01J 8/1818;
(Continued)

(56) References Cited

U.S. PATENT DOCUMENTS 3,475,832 A   11/1969  Kuelling
7,727,586 B2   6/2010  Bruhns et al.
(Continued)

FOREIGN PATENT DOCUMENTS

FR    3 020 451 A1   10/2015
WO  WO 01/79306 A1  10/2001
(Continued)

OTHER PUBLICATIONS

International Search Report and Written Opinion of the International Searching Authority, dated May 29, 2018, pp. 1-14, issued in International Patent Application No. PCT/US2018/018636, European Patent Office, Rijswijk, The Netherlands.
(Continued)

*Primary Examiner* — John P McCormack
(74) *Attorney, Agent, or Firm* — Crowell & Moring LLP

(57) ABSTRACT

A fluidized bed system is a single unitary modular system that packages a circulation fan, a fluidized bed, and a dust collection system within a same structure. The structure is formed to include internal ducts to provide fluid communication between the circulation fan, the fluidized bed, and the dust collection system. The fan provides a flow of air via a pressure duct to the fluidized bed. Particulate is separated from particles included on the fluidized bed by the flow of air being uniformly distributed to the fluidized bed. Particulate separated in a disengagement area and suspended in the flow of air is conducted through a particulate clearance space surrounding the dust collection system. The particulate is captured by the dust collection system and conveyed to a location external to the system.

20 Claims, 6 Drawing Sheets

Related U.S. Application Data

(60) Provisional application No. 62/461,029, filed on Feb. 20, 2017.

(51) Int. Cl.
  *B01D 46/00* (2022.01)
  *F26B 3/084* (2006.01)
  *F23C 10/26* (2006.01)
  *F26B 23/02* (2006.01)
  *B01J 8/18* (2006.01)
  *B01J 2/16* (2006.01)

(52) U.S. Cl.
  CPC ............ *B01J 8/1818* (2013.01); *F23C 10/26* (2013.01); *F26B 3/08* (2013.01); *F26B 3/082* (2013.01); *F26B 3/084* (2013.01); *F26B 23/02* (2013.01); *B01D 2279/35* (2013.01); *B01J 8/1863* (2013.01); *B01J 2208/00991* (2013.01)

(58) Field of Classification Search
  CPC .. B01J 8/1863; B01J 2/16; B01J 2208/00991; B01D 46/0041; B01D 2279/35; F23C 10/26
  USPC .............................................. 34/367; 422/145
  See application file for complete search history.

(56) References Cited

U.S. PATENT DOCUMENTS

| | | |
|---|---|---|
| 10,001,277 B2 | 6/2018 | Kanno et al. |
| 2006/0147355 A1 | 7/2006 | Beech, Jr. et al. |
| 2008/0201980 A1 | 8/2008 | Bullinger et al. |
| 2008/0203200 A1 | 8/2008 | Waldron et al. |
| 2017/0045293 A1* | 2/2017 | Caspers ................ F26B 17/103 |

FOREIGN PATENT DOCUMENTS

| | | |
|---|---|---|
| WO | WO 2006/079631 A1 | 8/2006 |
| WO | WO 2006/079631 B1 | 8/2006 |
| WO | WO 2006/109629 A1 | 10/2006 |
| WO | WO 2015/166358 A1 | 11/2015 |
| WO | WO 2015/166358 B2 | 11/2015 |

OTHER PUBLICATIONS

European Office Action dated Sep. 18, 2020, pp. 1-6, issued in European Patent Application No. 18 714 386.2, European Patent Office, Munich, Germany.

* cited by examiner

FLUIDIZED BED SYSTEM

CROSS-REFERENCE TO RELATED APPLICATIONS

This application is a continuation of U.S. patent application Ser. No. 15/899,249 filed Feb. 19, 2018, which claims priority under 35 U.S.C. § 119(e) to U.S. Provisional Application No. 62/461,029, filed Feb. 20, 2017 the entire contents of which is hereby incorporated by reference.

TECHNICAL FIELD

This disclosure relates to fluidized beds and more particularly to a continuous fluidized bed system.

BACKGROUND

Fluidized bed systems operate to contact solid particles with a fluidization medium (gas or liquid). In general, a fluidized bed operates on the principal of creating a fluid solid mixture, which due to operating conditions has properties that resemble a fluid. Thus, characteristics of solid particles introduced into a fluidized bed may be modified by changes in temperature and or exposure to fluidization medium.

DETAILED DESCRIPTION

The disclosed continuous fluidized bed system can be employed for heating, drying, coating, granulating, spray drying, cooling, and other processes involving particulate solids. The equipment arrangements used to accomplish all these processes are largely similar, with some modifications as described herein. In general, the disclosed fluidized bed system includes a prime air mover, a fluidized bed, and dust collection. Heating and drying applications require an additional heat source, often in the form of a gas fired burner and associated combustion chamber. Cooling applications may require additional cooling sources when ambient conditions cannot meet process requirements. The fluidized bed applications rely on ducting to connect each piece of process equipment to complete the unit operation.

Use of the system in fluidized bed heating or drying applications include a centrifugal blower with outlet ducted into an air heater, then into the lower plenum of the fluidized bed, then into a dust collector. The air heater may be comprised of either direct fired or indirect air heaters where fuels are burned in the airstream; or indirect heated systems such as steam to air heat exchangers, electric resistance heating, or indirect fired heaters. The system may also include ducting that recirculates a portion of the gas stream back to the inlet of the blower thus recovering a portion of the thermal energy that would be exhausted in a "once through" gas system.

Figure 1:
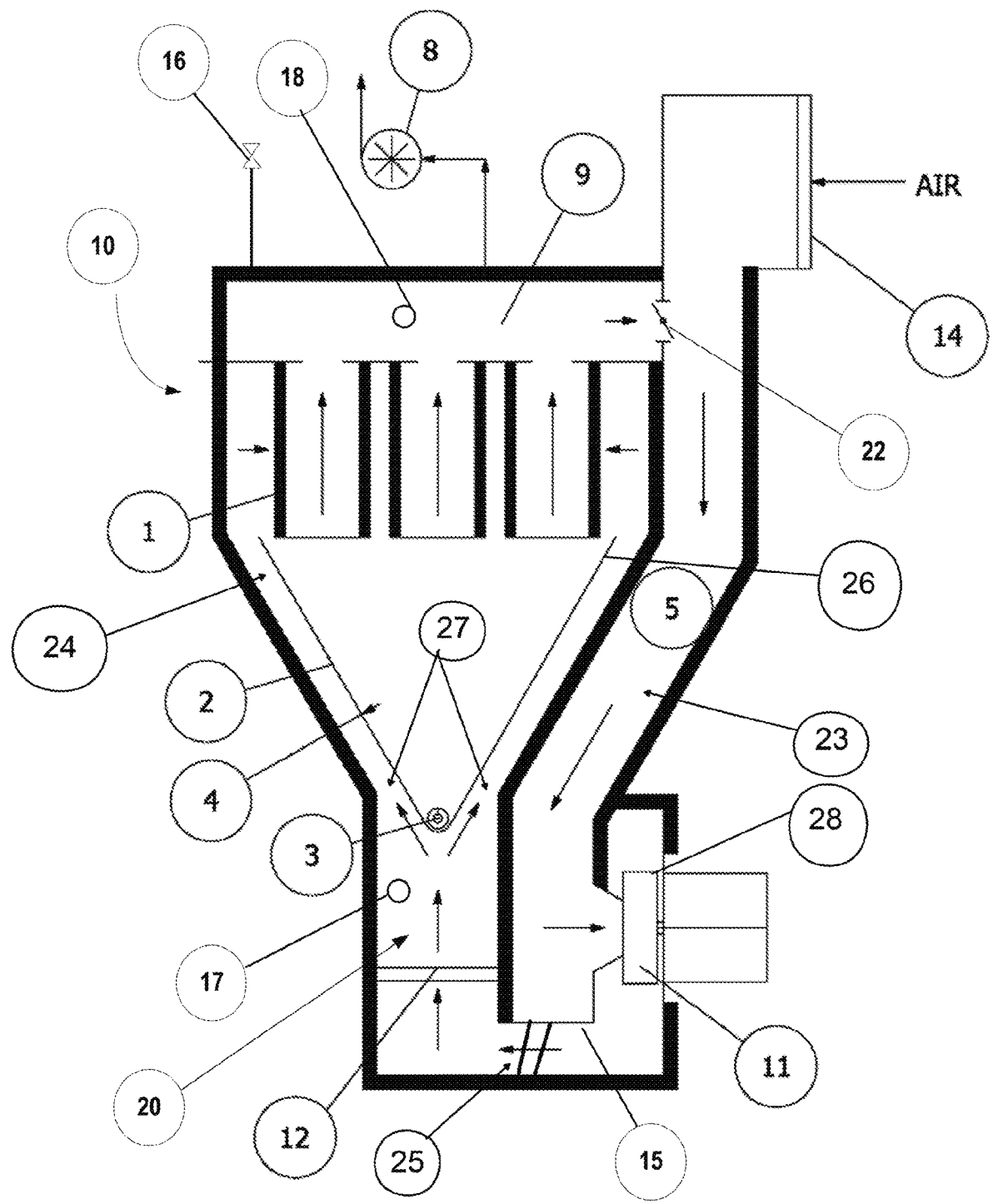
FIG. 1 is a cross section view of an example fluidized bed system operable as a cooler.
Figure 2:
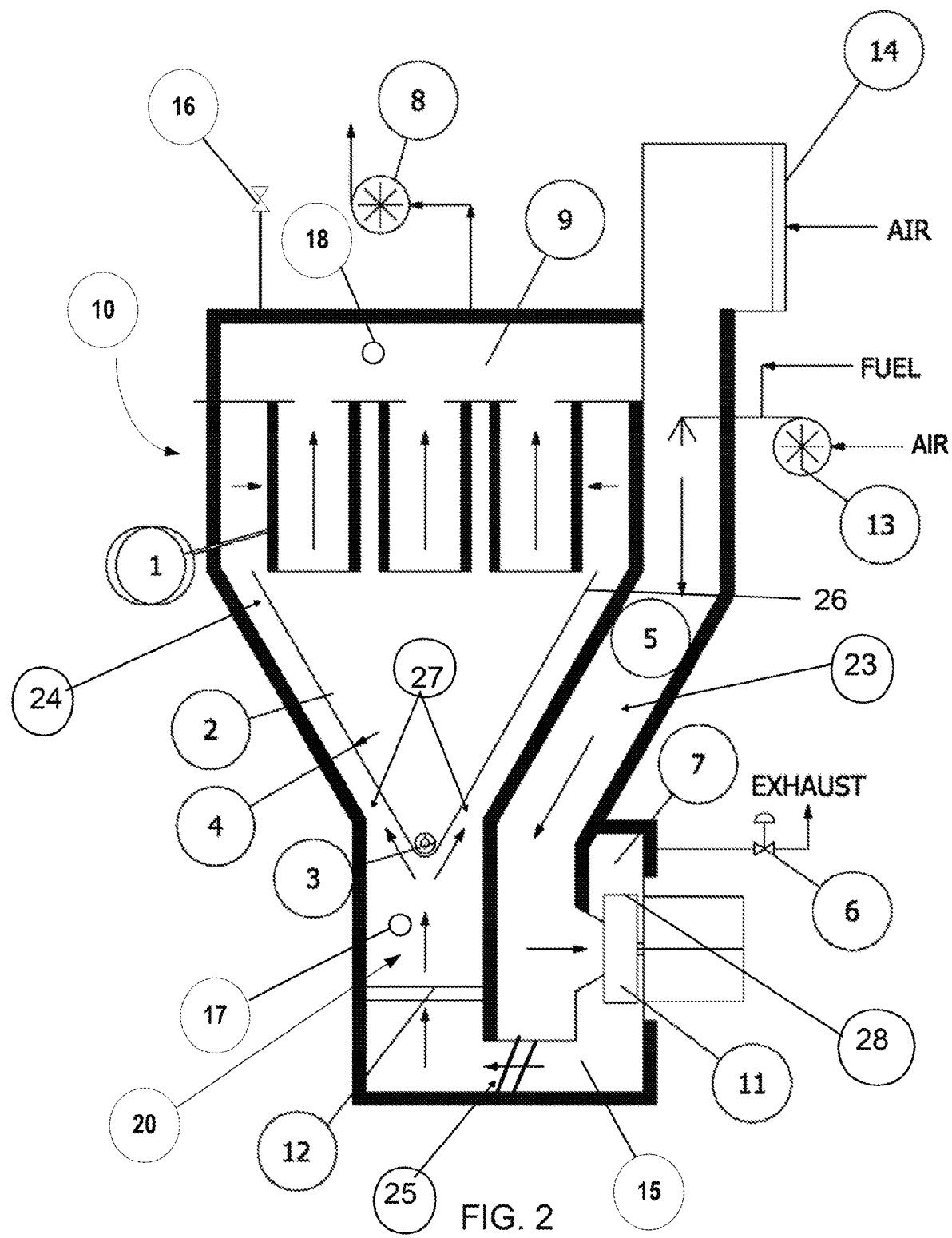
FIG. 2 is a cross section view of an example fluidized bed system operable as a dryer.
Figure 3:
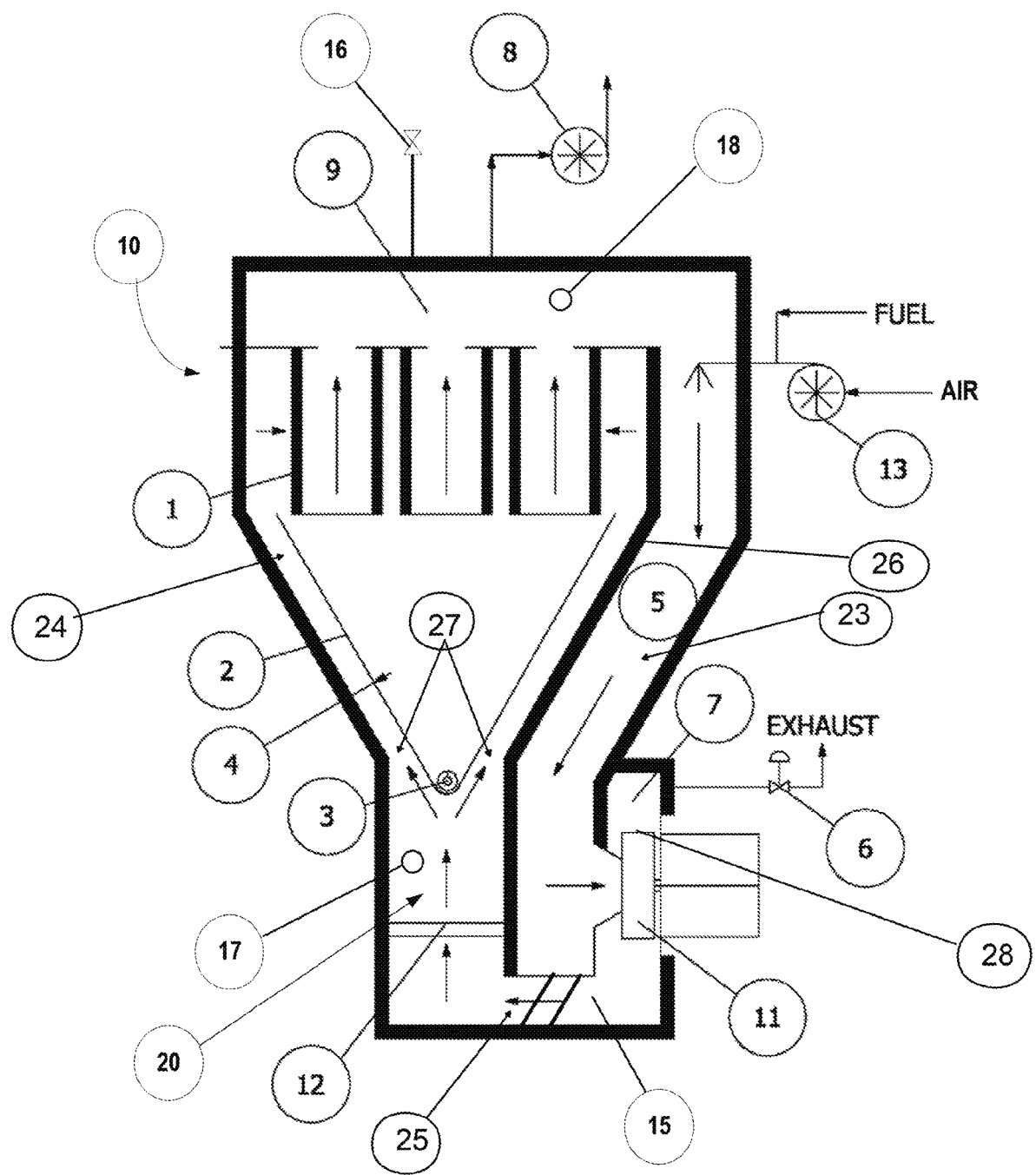
FIG. 3 is a cross section view of an example fluidized bed system operable as a heater.

FIGS. 1-3 are examples of the fluidized bed system configured as a Cooler, Dryer, and Heater, respectively. Although not illustrated, fluidized beds for use as spray dryers, granulators, and other processes are also possible using the system by modifications of one or more of the examples described in FIGS. 1-3.

Using the system, particles for which it is desirable to cool, dry, heat, granulate, coat or spray dry are introduced to a fluidized bed 12 to form a group of particles. The particles may be uniformly deposited at an entry side of the fluidized bed 12 and are then progressively moved across the fluidized bed to an exit side of the fluidized bed due to the addition of more particles at the entry side. It is desirable to only receive particles at the exit side of the fluidized bed within a predetermined range of sizes, or diameters. Those particles smaller than the desirable size are removed by the system as particulate. The system may operate with average particle sizes from 90-100 microns up to about 4 millimeters, and the average particulate sizes removable by the system are in a range of one tenth of the particle size and smaller. As used herein, the term "particle" refers to the desirable material provided at the exit side of the fluidized bed, and the term "particulate" refers to the undesirable material that is removed from the fluidized bed.

Referring to FIGS. 1-3, a cross section of a width of the unit is illustrated. The unit may include an enclosure having an inner chamber (23), a fluidized bed (12), a dust collection system (24), and a fan (11). In some examples, the fluidized bed (12), the dust collection system (24), and the fan (11) may be positioned within the inner chamber (23). The length of the unit may vary based on particular system requirements. The system is a fully integrated, compact, self-contained package design that provides for efficient installation, operation, and maintenance due to the fully integrated components and minimized duct lengths and losses. The system also includes pre-insulated walls (as illustrated by the thick lines in the figures) to minimize heat loss. This is in sharp contrast to other arrangements where equipment and ducts are fabricated and installed before being insulated for energy efficiency and personnel protection. In addition, when equipment is separately fabricated and installed, support and access structures are also typically constructed and erected for each individual piece of equipment. In many cases, such ductwork, insulation, support and access structures and other installation requirements significantly increase cost and delays.

The fluidized bed (12) may include a bed of granules or particles exposed to a stream of gases such that the granules or particles become fluidized. The fluidized bed (12) may be configured to process particles and remove particulate. During operation, gases are recirculated through integral passageways of the system by a variable speed fan, such as a plug style fan (11) as illustrated by arrows. In FIGS. 1-3, the internal passages are ducts that are integral to the modular unit. The ducts include: a suction duct (5), a pressure duct (15), a disengaging area (20), a particulate clearance space (4), and a filtered air chamber (9). In the illustrated example, the fan (11) is a centrifugal fan that is speed controlled to maintain a constant and uniform airflow through the fluidized bed (12). In other examples, the system may be modified such that use of an axial flow fan, or a cross flow fan are possible.

The unit also includes a dust collector system. The dust collector system may include, among other things, an integral dust collector (1), a dust hopper (2), an integral conveyor device (3), the particulate clearance space (4), and a filtered air chamber (9). The integral dust collector (1), which may be, for example, a bag style filter, a cartridge style filter, a cyclonic separator, or a settling chamber, is mounted directly above the bed in a fluidizing chamber such that the space between the dust hopper (2) and the walls of the fluidizing chamber form the particulate clearance space (4), which serves as an integral conduit through which dust laden gases are directed to the dust collector. Particulate from the fluidized bed (12) may be separated from the fluidized bed (12) and transported in the particulate clearance space (4) to the dust hopper (2). Particulate separated from the fluidized bed (12) may be received by the dust hopper (2) and removed from the inner chamber (23) by, for example, the integral conveyor device (3), such as a screw conveyor located within the dust hopper (2), for example at the bottom of the dust hopper (2). The dimensions of the particulate clearance space (4) may be adjusted to target the separation of specific particulate of a size below a critical threshold in accordance with the desired particle size.

The dust hopper (2) may be a collection unit configured to collect or capture particulate received from fluidized bed (12) via the particulate clearance space (4). The dust hopper (2) may be positioned above the fluidized bed (12). The outer wall (26) of the dust hopper (2) may at least partially define the particulate clearance space (4). The integral conveyor device (3) may be positioned within the dust hopper (2). In some examples, the dust hopper (2) may be conically shaped to facilitate directing particulate toward the integral conveyor device (3) for conveyance out of the dust hopper (2) and/or the inner chamber (23). The dust hopper (2) may be positioned at the disengaging height of the fluidized bed (12).

The integral conveyor device (3) may be a device positioned within the dust hopper (2) configured to convey particulate from the dust collection system (24). In some examples, a recycle stream may be included. The recycle stream may be configured to reintroduce the particulate removed from the dust hopper (2) to the fluidized bed (12). The recycle stream may include the integral conveyor device (3) to convey particulate from the dust hopper (2) into the recycle stream. The integral conveyor device (3) may be a conveyor screw or conveyor belt, for example.

The particulate clearance space (4) may be a vertical or angled passageway positioned above the disengaging area (20) configured to channel the particulate separated from the fluidized bed (12) to the dust hopper (2). In some examples the particulate clearance space (4) may surround the dust collection system (24). Alternatively or in addition, the particulate clearance space (4) may surround the dust hopper (2). In some examples, the particulate clearance space (4) may be at least partially defined by an outer wall (26) of the dust hopper (2). Alternatively or in addition, the particulate clear space (4) may be at least partially defined by a wall of the suction duct (5). A width of the particulate clearance space (4) may be substantially smaller than a width of the fluidized bed facilitating particulate separated from the fluidized bed (12) to travel into the particulate clearance space (4).

When the fluidized bed system is operating as a dryer or heater as illustrated in FIGS. 2 and 3, the gases may be heated either directly by combustion gases provided by a fuel burner (13) or indirectly through heat exchange surface. Suction duct (5) shares a common wall with a portion of the dust laden passages of the particulate clearance space (4) so as to create a compact combustion chamber, which minimizes heat loss. In addition, since the suction duct (5) uniformly surrounds the dust hopper (2), hot exhaust gases within the suction duct (5) may thermally communicate with the dust hopper and/or advantageously maintain the temperature of the dust hopper (2) at a level to avoid or reduce condensation or any other forms of humidity that could cause caking or fouling in the vicinity of the dust hopper (2). Gas heating means such as combustion burners, electric resistance heaters, or heat exchangers may be installed within the passage space formed by the suction duct (5).

For direct fired heaters, the bulk of the gases may be recirculated which increases the thermal efficiency of the system by minimizing exhaust gases. Exhaust gases may be vented to control moisture and combustion products levels from the system by one or more methods that include:

a. Installing a purge duct and control damper (6) on the pressure side of the recirculation fan (11) at location (7) that is between the recirculation fan discharge and the fluidized bed (12).

b. Installing an exhaust fan (8) at a location that is between the dust collection filters (10) and the suction of the recirculation fan (11), such as in a filtered air chamber (9).

The system combines a fluidized bed (12) with ductwork, fans, support and access structures, insulation and system wiring into a modular factory manufactured system. The packaged all-inclusive unit is not much larger than a traditional dust collector sized for the same process. Within the system, all the ducts are integral flow passages within the housing and minimize lengths and restrictions. The plenum geometry of the suction duct (5), a fan housing (28), and the pressure duct (15) between the fan (11) and the fluidized bed (12) accommodates the pressure fan(s) (11) further reducing the space requirements as well as eliminating the need for exterior interconnecting ductwork. This design also greatly reduces the externally exposed surface area of the system that is required to be insulated and the shared walls of the integrated flow passages significantly limit the energy transfer area with the environment.

The suction duct (5) may be a channel configured to direct the air flow to the fan (11), toward the dust collection system (24), or the particulate clearance space (4). The suction duct (5) may have a single cross-sectional diameter along a length of the suction duct (5). Alternatively, the suction duct (5) may have an expanding or contracting cross-sectional diameter along the length of the suction duct (5), for example to maintain a laminar flow of air within the suction duct (5). In some examples, air or gas in the suction duct (5) may thermally communicate with the dust collection system (24) or a portion of the dust collection system (24). This thermal communication may maintain a desired temperature of the dust collection system (24) or portion of the dust collection system (24) and avoid or reduce condensation within the dust collection system (24) or portion of the dust collection system (24). For example, the air or gas in the suction duct (5) may thermally communicate with the dust hopper (2), the particulate clearance space (4), the filtered air chamber (9), or the integral conveyor device (3) to maintain a temperature and avoid or reduce condensation therein.

The design described also, through eliminating duct length and flow restrictions, reduces the overall system pressure drop since there is no external floor mounted fan and custom made duct work to direct air flow into the unit. This reduction in overall pressure drop allows for more flexibility in the selection of deck plate of the fluidized bed (12) and reduces operating costs. Any form of deck plate may be used in the system. This allows the bedplate design to be optimized for the process and for airflow distribution without requiring oversized fans and fan drives. The design of the plenum and fan is such that the required bed plate pressure drop required to deliver uniform distribution of gas flow is significantly less than that of other designs. Benefits of this uniform gas distribution as well as the overall geometry of the design is conducive to classification of the solids feed by particle size as well as greatly reducing the disengaging height shown in FIG. 4 that is required to minimize particle entrainment.

The disengaging area (20) includes the disengaging height in the vertical direction. The disengaging height is the height of disengaging area (20) above the fluidized bed (12) used to disengage particles from the flow of air in the fluidized bed (12), allowing the particles thus disengaged from the flow of air to fall back into the fluidized bed (12). Alternatively, the disengaging height is a threshold height of the disengaging area (20) above the fluidized bed (12) wherein the particulate separates from among the particles and the particulate is carried into the particulate clearance space (4). In some examples, the disengaging height may be in a range from 70% to 200% of the width of the fluidized bed (12). In other examples, the disengaging height may be in a range from 70% to 400% of the width of the fluidized bed. Selection of the disengaging height representing the distance needed between the fluidized bed (12) and the bottom of the dust collector (1) may be chosen to remove particulate of a certain size. The disengaging height may be predetermined and preset above the fluidized bed (12) such that the particulate separated from the fluidized bed (12) may travel in a flow of air to reach an entrance to the particulate clearance space (4), the flow of air being through the fluidized bed (12) toward the dust collection system (24). Alternatively or in addition, the disengaging height may be dynamically adjustable. Adjustment of the disengaging height may be manual or by automatic control. Such adjustment may be performed to lengthen or shorten the duct length above the fluidized bed (12) by, for example, use of a telescoping duct, an accordion style section of the duct, or any other mechanism to change the distance.

Figure 4:
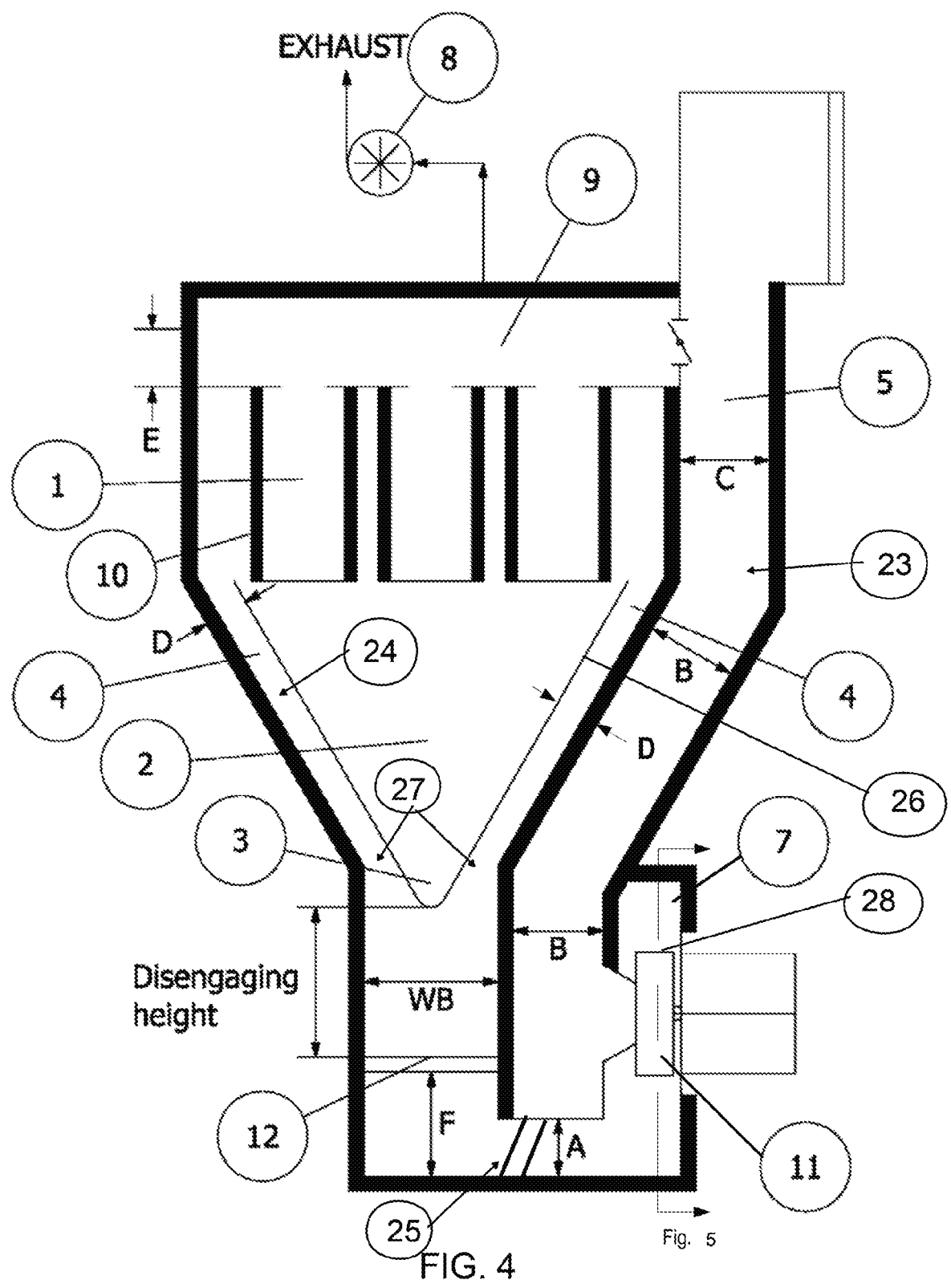
FIG. 4 is a cross section view of an example fluidized bed system illustrating various dimensions within the system.
Figure 5:
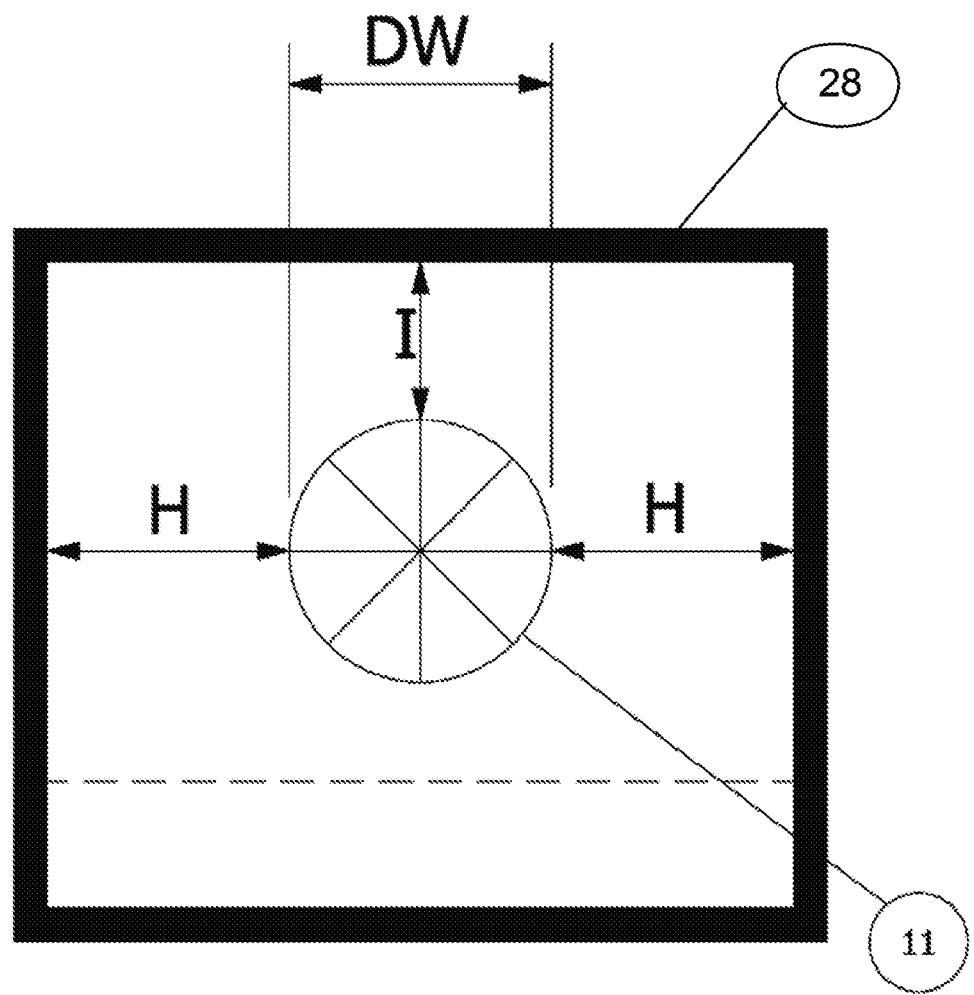
FIG. 5 is a cross section view of an example of the exhaust fan shown in FIG. 4, illustrating various dimensions.

The performance of the disclosed fluidized bed system may be based on predetermined geometric ratios, such as the geometrical ratios shown in FIGS. 4 and 5 and listed in Table 1. In Table 1, the percentages for dimensions A, B, C, D, E & F are a percentage of the width of fluidized bed (12). The predetermined geometric ratios described in Table 1 have been found to maintain air flow as laminar air flow during operation of the fluidized bed system. The air flow being laminar flow may assist in providing consistent performance of the fluidized bed system and reduce spouting. As used in Table 1, feature A is a diameter of the pressure duct (15), feature B is a diameter of a portion of the suction duct (5), feature C is a diameter of another portion of the suction duct (5), feature D is a diameter of the particulate clearance space (4), and feature E is a diameter of the filtered air chamber (9). As used herein, "diameter" is not intended to be limited to features having a circular cross-section, but includes any distance across a cross-section of a feature, such as a duct, chamber, or fan. In addition, in the example of a centrifugal fan, as illustrated in the cross-section view of the fan (11) illustrated in FIG. 5, H may be 12.5% or greater than the diameter of the wheel (DW) of the fan (11). Further, the percentages for the dimension I shown in FIG. 5 are a percentage of the wheel diameter, DW, of the fan (11). The dimension I may be a distance from an edge of the fan (11) to an edge of the fan housing (28), as shown in FIG. 5.

TABLE 1

| key | | range from | range to | preferred range from | preferred range to | most preferred range from | most preferred range to |
|---|---|---|---|---|---|---|---|
| A | % of bed | 10% | 110% | 25% | 75% | 40% | 60% |
| B | width, WB | 10% | 110% | 25% | 75% | 40% | 60% |
| C | | 50% | 130% | 50% | 110% | 70% | 90% |
| D | | 5% | 50% | 10% | 30% | 15% | 25% |
| E | | 40% | 120% | 50% | 100% | 60% | 80% |
| F | | 50% | 160% | 70% | 130% | 90% | 110% |
| I | % of wheel diameter, DW | 12.50% | 110% | 25% | 85% | 50% | 60% |

Embodiments of this disclosure can also include the use of adhesives or brazing compounds in the fabrication of the perforated bedplate and its attachment to the support grid and/or air distribution plates. Suitable adhesives for this purpose include, but are not limited to, epoxies, acrylics, urethanes, thermoplastics, hot melt, and other suitable structural adhesives. Suitable brazing compounds for this purpose can include, but are not limited to lead, brass, bronze, solder, silver solder, tin, zinc and mixtures of these metals and alloys. This design further reduces dead areas and potential leaking and spouting points that can be created by the use of traditional mechanical fasteners.

The fan (11) may direct the air flow from the suction duct (5) to the pressure duct (15). An outlet of the suction duct (5) may be coupled to the fan (11) and an inlet of the pressure duct (15) may be coupled to the fan (11). The fan (11) may operate to propel the air at a laminar flow to allow controlled and consistent distribution of air flow to the fluidized bed (12). The fan (11) is positioned within the fan housing (28) and may be positioned within the inner chamber (23) to eliminate the need for additional ducts and pressure drop calculations. The fan (11) may be a variable speed fan.

The pressure duct (15) may be a channel directing air from the fan (11) to the fluidized bed (12). The pressure duct (15) includes a number of features in addition to dimensions A and F to create a desired airflow pattern at the fluidized bed (12). In example systems, the pressure duct (15) may be a generally rectangular passageway. In other examples, the pressure duct (15) may include vanes (25) such as baffles, straighteners, and other features to produce uniform air flow at the fluidized bed (12). The vanes (25) may be fixed or moveable. In examples including moveable vanes (25) the vanes (25) may be automated or manually moveable. The vanes (25) may direct the flow of air to predetermined portions of the fluidized bed (12).

As illustrated in FIGS. 1-4, air flowing from the fan (11) may change direction by 180 degrees to flow through the fluidized bed (12). Due to the predetermined dimensions and configuration of pressure duct (15), the fluidized bed (12) is not subject to unequal air flow or pressures capable of creating spouting points.

FIGS. 1-4 illustrate a single fan (11) and plenum (suction duct (5) and the pressure duct (15)), however, any number of fans (11) and corresponding plenums may be placed in parallel within the system. Because the pressure plenum design disclosed allows for integral ductless air movers (fans), this easily allows for the use of two or more pressure fans. The integral flow chambers for each of the multiple fans may then be separated with internal baffles allowing for multiple zones down the length of the fluidizing bedplate, each with a separate plug fan (11). Each of these zones of the fluidized bed (12) may now be independently controlled to run at different velocities, pressures, temperatures, etc. Thus, as operational conditions of the fluidized bed (12) changes, zones can be correspondingly controlled.

The adhesive fabrication detail of the fluidized bed (12) allows for varying of the percent open area or other bedplate specification along the length of the fluidized bed further enhancing the flexibility and adaptability of the system. The value of this design can be easily imagined when processing materials that have handling characteristics that change with varying temperature, moisture content, or other process variable. For example, wet particles and particulate that enter the fluidized bed (12) may begin to dry out as the particles and particulate move through the zones, and the corresponding fan speed for subsequent zones may be correspondingly decreased to maintain the desired level of particulate separated from among progressively drying particles. The system, in combination with the controls disclosed below, also provides for the elimination of condensation near a heater or dryer inlet when processing hygroscopic materials with low surface temperatures. The zone at the inlet can be run at a sufficient temperature such that the air leaving the bed retains enough moisture carrying capacity to prevent condensation on the material surface.

The dust collection system (24) is located vertically over the fluidized bedplate but is designed to not allow particulate to drop back onto the fluidized bed once separated from the particles. This arrangement allows for the disengaging area (20) within the disengaging height above the bedplate to minimize both on-spec material carryover to dust collection as well as off-spec material carryover to product. Above the disengaging area (20) the flow path narrows to increase velocity and prevent material that makes it beyond the disengaging height from settling out on the slanted surfaces. This flow path is created by the outer wall of the fluid bed and the walls (26) of the integral dust collection hopper (2). The modular design of the unit also allows for varying the area of the clearance space (4). For example, the area of the clearance space (4) may be adjusted by raising and lowering the dust hopper (2) or by using an insert in the clearance space (4) to adjust pressure and velocity of the air flow in the clearance space (4) to further minimize any chance of material carryover.

This geometry and the ability to generate such uniform airflow distribution at the deck plate of the fluidized bed (12) show how the unit can be employed as an air classifier. Velocity control and distribution are such that not only is spouting in the fluidized bed minimized or eliminated but airflow can be tailored to strip particulate and dusts below a certain size specification with minimal to no carryover of on-size particles. This unique geometry and control also allows the disengaging height to be kept to a minimum, further enhancing the packaged unit's compact attributes. After the dust laden air passes through the clearance space (4), it enters the large volume chamber where the filters (10) and interior of the dust hopper (2) are located. Here the dust laden air decelerates below transport velocity and most of the dust and particulate falls by gravity into the integral hopper (2) before becoming trapped on the filters (10). This decreased filter loading reduces filter purge requirements, such as cleaning pulse air consumption, significantly. When filters (10) are subject to the air pulses, the particulate and dust extracted from the filters (10) also falls into the integral dust hopper (2) where it is conveyed outside the unit by the integral conveyor device (3).

In an alternative example the system may include only a portion of the previously discussed dust collection system (24). This may be useful for installations in locations that already have large scale dust collection or wet scrubbing that is external to the system. In these situations, the filters (10), a tube sheet positioned between and at the top of the filters (10) to keep the dirty and filtered air separate, and pulsed air purging of the filters may be omitted, but the dust hopper (2) and integral conveyor device (3) remain. The tube sheet and filters (10) may be replaced with baffles designed to impinge the larger and heavier dust and particulate and allow them to fall into the hopper (2). This may greatly reduce the load on the collection or scrubbing system.

A number of control methodologies are also included in the system. Because of the extremely compact integral flow passages a method of air volume control that does not require a flowmeter such as a hotwire or pitot tube is desired. Instead, in an example, the fan wheel speed, fan static pressure, and fan power load may all be closely monitored. These readings may be used to control the fan speed to target a specific velocity at the fluidized bed plate. This control method can greatly increase heat exchange effectiveness by ensuring that the bed is not severely spouted causing air to pass through the fluidized bedplate without contacting the process material. This same algorithm can be employed to sense bed stagnation caused by a surge in rate or material cohesion. The fan speed can then be dynamically increased (or decreased) to prevent loss of fluidization and material transport. As the stagnation or spouting condition is cleared the monitored variables dynamically return to standard operating conditions to maintain efficient operation. In addition, one or multiple temperatures sensors (17) may be positioned above the fluidized bed (12) to monitor and control the health of the fluidized bed.

For the most efficient operation of heaters and dryers a significant amount of heat energy can be recovered through recycling some of the heated air back to the fan inlet. This recirculation and heat recovery also limits the amount of air and combustion products that are vented to the atmosphere through the discharge stack. In the case of direct combustion heating and drying applications a certain amount of air changes may be used to prevent combustion products and other sources of moisture from building up in the system.

The use of variable open area fresh air inlet dampers (16) and process air outlet dampers (6) in combination with a humidity sensor (18) in the filter section can optimize vent air volumes such that a minimum amount of process air is vented but a certain humidity threshold is never reached. This maximizes heat recovery, minimizes vent air, and further prevents any opportunities for condensation near the inlet for drying and heating applications. This humidity control, coupled with a "warming mode" during off time, eliminates opportunities for condensation or humidity caking with hygroscopic dusts in the dust hopper (2). The warming mode uses heating to keep the internal unit temperature the desired differential above the outside ambient temperature. The system may use fan operation with limited venting to hold this temperature, but other heating methods may also be employed.

This same partial recirculation control methodology can be used in cooling applications, such as in the example of FIG. 1, in which a minimum inlet air temp must be maintained. The ability of the modular package of the system to have tailored internal bypass dampers can significantly reduce or eliminate the need for make-up heaters for inlet air in these types of cooling applications. In FIG. 1, an internal bypass damper (22) may be dynamically controlled to introduce heated air from the filtered air chamber (9) to the suction duct (5).

Some cooling applications may employ supplemental cooling to shrink the overall unit size or to allow for full process rate throughout the year regardless of season. For example, the system may use humidification to cool the airstream. In other examples the humidification cooling can also be used to clean the inlet air stream such as in a low pressure drop horizontal or vertical scrubber.

Still another advantage of the close compact design is that it allows the use of standardized common components for heating, drying, and cooling systems. Only rearranging of internal baffles, inlet/outlet venting, and size and presence of a burner in the combustion chamber will differ for all three applications. The modular design can even allow for quick conversion from once through applications common for dryers and coolers, to partial recirculation applications for economic gas fired heating and temperature sensitive substrate cooling, to full recirculation modes. The full recirculation mode can be used to air classify or for heating/cooling applications in which a closed loop is desired or humidity venting is not an issue The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Figure 6:
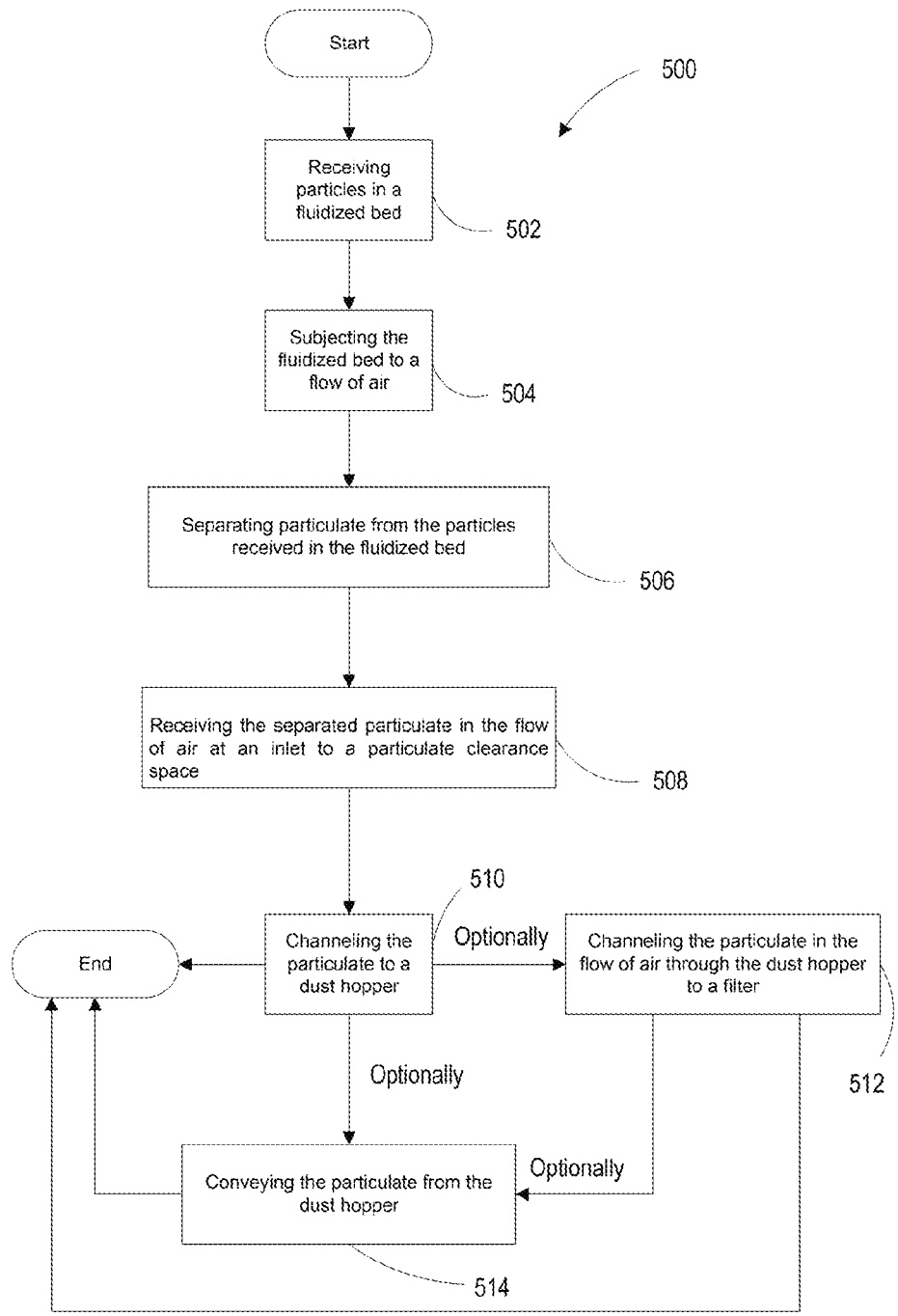
FIG. 6 is a flow chart of an example method of separating particulate from particles in a fluidized bed.

FIG. 6 shows a flow chart of an example method (500) of separating particulate from the particles and the fluidized bed. The method (500) may include receiving (502) particles in the fluidized bed (12) disposed in a housing structure. The housing structure may be configured to include the fan (11), the fluidized bed (12), and the dust collection system (24). The method (500) may further include subjecting (504) the fluidized bed to the air flow supplied by the fan (11). The method may further include separating (506) particulate from the particles included in the fluidized bed (12) within the disengaging height. The method may further include (508) receiving the separated particulate in the flow of air at the inlet (27) of the particulate clearance space (4). The method may further include channeling the particulate in the flow of air vertically or angled through the particulate clearance space (4) to the dust hopper (2).

Optionally, the method may include conveying the particulate from the dust hopper (2) with an integral conveyor device (3) such as a screw conveyor. Optionally, the method may include channeling the particulate through the dust collectors (1), and the dust collectors (1) may be positioned above the dust hopper (2).

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, and not the only possible embodiments and implementations.

What is claimed is:

1. A fluidized bed system comprising:
   an enclosure having an inner chamber positioned below a dust hopper;
   a fluidized bed positioned in the inner chamber below the dust hopper and configured to process particles and remove particulate;
   a fan included in a plenum, the fan configured to provide a flow of air through the fluidized bed toward the dust hopper; and
   a wall defining the inner chamber, the dust hopper moveably positioned vertically within the inner chamber at a predetermined height above the fluidized bed to separate a predetermined size of particulate from the particles within the flow of air toward the dust hopper, the dust hopper at least partially surrounded by the wall to provide a particulate clearance space between the wall and the dust hopper, an entrance to the particulate clearance space configured to receive only the predetermined size of the particulate separated from the particles within the flow of air due to the predetermined height.

2. The fluidized bed system of claim 1, further comprising a pressure duct at an outlet of the fan and a suction duct at an inlet of the fan, the suction duct having heated air that is in thermal communication with the dust hopper, and the pressure duct is configured to provide the flow of air in a uniformly distributed laminar flow to the fluidized bed.

3. The fluidized bed system of claim 2 wherein the pressure duct comprises vanes positioned to direct the uniformly distributed laminar flow to the fluidized bed.

4. The fluidized bed system of claim 1, further comprising a dust collector positioned above the dust hopper such that the particulate clearance space channels the particulate to the dust collector.

5. The fluidized bed system of claim 1, wherein the particulate clearance space forms a vertical passageway configured to channel the particulate away from the fluidized bed and into the dust hopper.

6. The fluidized bed system of claim 5, wherein the predetermined height is a disengaging height above the fluidized bed at which the particulate disengage from the particles and travels in the flow of air to the entrance to the particulate clearance space, and the particles remain above the fluidized bed.

7. The fluidized bed system of claim 1, further comprising a recycle system configured to recycle at least a portion of the particulate separated from the particles.

8. The fluidized bed system of claim 7, wherein the recycle system comprises a screw conveyor included within the dust hopper, the screw conveyor configured to convey particulate from the dust hopper.

9. The fluidized bed system of claim 1, wherein the dust hopper is at least partially conically shaped to form the particulate clearance space.

10. A fluidized bed system comprising:
a housing;
a variable speed fan disposed in the housing;
a suction duct formed within the housing and coupled with an inlet of the variable speed fan;
a pressure duct formed within the housing and coupled with an outlet of the variable speed fan;
a fluidized bed included within the housing and configured to receive a flow of air from the pressure duct; and
a dust hopper vertically moveable above the fluidized bed to create a predetermined distance between the dust hopper and the fluidized bed, the predetermined distance providing a disengaging height at which particulate is separated from particles; and
a wall surrounding at least part of the fluidized bed and the dust hopper, such that a particulate clearance space is formed between the wall the dust hopper having an inlet to receive the particulate.

11. The fluidized bed system of claim 10, wherein the flow of air is a laminar flow of air, and the variable speed fan is configured to vary a velocity of the laminar flow of air.

12. The fluidized bed system of claim 10, wherein the flow of air is a laminar flow of air, and the pressure duct includes vanes configured to maintain and direct the laminar flow of air to the fluidized bed.

13. The fluidized bed system of claim 12, wherein the vanes are automated to direct the laminar flow of air to a predetermined portion of the fluidized bed.

14. The fluidized bed system of claim 10, wherein the pressure duct is configured to change a direction of the flow of air by 180 degrees from the variable speed fan to the fluidized bed.

15. The fluidized bed system of claim 10 further comprising a filtered air chamber positioned above the dust hopper, wherein the filtered air chamber is configured to receive an amount of the particulate from the particulate clearance space and direct at least a portion of the particulate into the dust hopper.

16. The fluidized bed system of claim 15, further comprising a bypass damper configured to dynamically control introduction of heated air from the filtered air chamber to the suction duct.

17. The fluidized bed system of claim 16, further comprising an exhaust fan configured to exhaust the heated air from the filter air chamber.

18. A method comprising:
receiving particles in a fluidized bed, the fluidized bed being disposed in a housing structure, the housing structure configured to include a circulation fan, the fluidized bed, and a dust hopper disposed in the housing structure in fluid communication;
subjecting the fluidized bed to a flow of air supplied by the circulation fan through the housing structure to a bottom side of the fluidized bed;
adjusting a vertical height of the dust hopper above the fluidized bed to a predetermined disengaging height;
separating particulate from the particles received in the fluidized bed within the disengaging height above the fluidized bed;
receiving the separated particulate in the flow of air at an inlet to a particulate clearance space formed between the dust hopper and a wall of the housing structure, the inlet being above the disengaging height; and
channeling the particulate in the flow of air vertically via the particulate clearance space to the dust hopper.

19. The method of claim 18, further comprising channeling the particulate in the flow of air with the particulate clearance space to a filter positioned above the dust hopper.

20. The method of claim 18 further comprising capturing at least some of the particulate in the dust hopper and conveying the particulate from the dust hopper with a screw conveyor positioned within the dust hopper.

* * * * *